US011864713B2

United States Patent
Jung et al.

(10) Patent No.: US 11,864,713 B2
(45) Date of Patent: Jan. 9, 2024

(54) FAN MOTOR

(71) Applicant: LG Electronics Inc., Seoul (KR)

(72) Inventors: Younggyu Jung, Seoul (KR); Seungjo Baek, Seoul (KR); Seongho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 747 days.

(21) Appl. No.: 16/478,372

(22) PCT Filed: Jan. 16, 2018

(86) PCT No.: PCT/KR2018/000758
§ 371 (c)(1),
(2) Date: Jul. 16, 2019

(87) PCT Pub. No.: WO2018/131988
PCT Pub. Date: Jul. 19, 2018

(65) Prior Publication Data
US 2019/0365167 A1 Dec. 5, 2019

(30) Foreign Application Priority Data
Jan. 16, 2017 (KR) .................. 10-2017-0006985

(51) Int. Cl.
*A47L 5/22* (2006.01)
*F16C 37/00* (2006.01)
(Continued)

(52) U.S. Cl.
CPC ............... *A47L 5/22* (2013.01); *F16C 37/00* (2013.01); *H02K 7/14* (2013.01); *H02K 9/06* (2013.01);
(Continued)

(58) Field of Classification Search
CPC ........ A47L 5/22; A47L 9/2889; F04D 29/046; F04D 29/056; H02K 7/14; H02K 9/06;
(Continued)

(56) References Cited

U.S. PATENT DOCUMENTS 3,245,610 A * 4/1966 Sebok .................. A47L 5/22
415/199.2
5,296,772 A 3/1994 Bradfield et al.
(Continued)

FOREIGN PATENT DOCUMENTS

JP        S51138806        11/1976
JP        S52238806        11/1976
(Continued)

OTHER PUBLICATIONS

Extended European Search Report in European Appln. No. 18739214.7, dated Sep. 21, 2020, 9 pages.

*Primary Examiner* — Charles G Freay
*Assistant Examiner* — Lilya Pekarskaya
(74) *Attorney, Agent, or Firm* — Fish & Richardson P.C.

(57) ABSTRACT

A fan motor includes: a motor body; a rotary shaft assembly having a rotor and a bearing mounted on a rotary shaft; a stator that surrounds the rotor; an impeller connected to the rotary shaft; and a bracket including a bearing housing portion for receiving the bearing. The bearing housing portion defines a bearing heat dissipating flow path that allows air to be discharged to an outside of the bearing housing portion after passing between the outer surface of the bearing and the bearing housing portion. Air blown from the impeller can absorb heat of the bearing by contacting an outer surface of the bearing while passing through the bearing heat dissipating flow path.

19 Claims, 7 Drawing Sheets

(51) Int. Cl.
*H02K 7/14* (2006.01)
*H02K 9/06* (2006.01)
F04D 29/056 (2006.01)
F04D 29/046 (2006.01)
H02K 5/20 (2006.01)

(52) U.S. Cl.
CPC .......... *F04D 29/046* (2013.01); *F04D 29/056* (2013.01); *H02K 5/207* (2021.01)

(58) Field of Classification Search
CPC ...... H02K 5/207; H02K 5/1732; F16C 37/00; F16C 2314/00; F16C 2380/26; F16C 37/007
See application file for complete search history.

(56) References Cited

U.S. PATENT DOCUMENTS

| | | | |
|---|---|---|---|
| 7,579,741 | B2 | 8/2009 | Morikaku et al. |
| 2011/0217195 | A1* | 9/2011 | Finkenbinder .......... F04D 29/44 415/206 |
| 2014/0328684 | A1 | 11/2014 | King |
| 2017/0314573 | A1* | 11/2017 | Hayamitsu ............ F04D 29/281 |
| 2018/0073557 | A1* | 3/2018 | Hwang ................... F16C 19/02 |
| 2018/0076682 | A1* | 3/2018 | Hwang ................. H02K 5/207 |

FOREIGN PATENT DOCUMENTS

| | | |
|---|---|---|
| JP | 2002305853 | 10/2002 |
| JP | 2007318919 | 12/2007 |
| KR | 20080050676 | 6/2008 |
| KR | 20100078745 | 7/2010 |
| KR | 101287468 | 7/2013 |
| KR | 101464705 | 12/2014 |

\* cited by examiner

FAN MOTOR

CROSS-REFERENCE TO RELATED APPLICATIONS

This application is a National Stage application under 35 U.S.C. § 371 of International Application No. PCT/KR2018/000758, filed on Jan. 16, 2018, which claims the benefit of Korean Patent Application No. 10-2017-0006985, filed on Jan. 16, 2017. The disclosures of the prior applications are incorporated by reference in their entirety.

TECHNICAL FIELD

The present invention relates to a fan motor, and particularly to a fan motor in which an impeller and a bearing are installed on a rotary shaft.

BACKGROUND ART

A fan motor may be installed in a home appliance such as a vacuum cleaner or the like, and in this case, the fan motor may generate a suction force for sucking air into a dust collecting unit.

An example of such a fan motor may include a motor housing, a stator provided in the motor housing, a rotor rotated by the stator, a rotary shaft on which the rotor is mounted, and an impeller installed in the rotary shaft.

When the rotary shaft of rotates, the fan motor may intake air as the impeller rotates.

The rotary shaft of the fan motor may be rotatably supported by at least one bearing, and in a state of being supported by the bearing, the rotary shaft may be rotated at a high speed.

If an internal temperature of the fan motor increases, performance of the fan motor may be deteriorated, and thus, the motor is preferably maintained not to be overheated at the internal temperature.

Heat of the bearing is one of various factors raising the internal temperature of the fan motor, and heat of the bearing is preferably dissipated to prevent overheating of the bearing. In particular, in the case of a fan motor in which the rotary shaft is rotated at a high speed, the bearing may be overheated, and in this case, the life of the bearing may be shortened.

DISCLOSURE

Technical Problem

An object of the present invention is to provide a fan motor in which air moved by an impeller is guided to an outer circumferential surface of a bearing to directly dissipate heat of the bearing and thus minimize a degradation of performance of the bearing due to overheat.

Technical Solution

To solve the technical problem as described above, there is provided a fan motor including: a motor body having a space formed therein; a rotary shaft assembly including a rotor and a bearing installed on a rotary shaft; a stator installed to surround the rotor in the motor body; an impeller connected to the rotary shaft; and a bracket having a bearing housing portion accommodating the bearing, the bracket installed in the motor body, wherein the bearing housing portion has a bearing heat dissipation flow path through which air moved by the impeller passes through between the bearing housing portion and an outer surface of the bearing and is discharged to the outside of the bearing housing portion.

The bearing heat dissipation flow path is formed to be parallel to the rotary shaft in the bearing housing portion.

The bearing heat dissipation flow path may be provided in plurality on the bearing housing portion. A plurality of contact surfaces of the bearing housing portion in contact with an outer surface of the bearing may be formed between a plurality of bearing heat dissipation flow paths.

The bearing heat dissipation flow path may include: a first heat dissipation flow path formed in parallel to the rotary shaft on an inner circumferential surface of the bearing housing portion, and a second heat dissipation flow path connecting an outer circumferential surface of the bearing housing portion to the first heat dissipation flow path.

A plurality of the second heat dissipation flow paths may be formed radially around the rotary shaft at the bearing housing.

The bearing may include: an inner rim fixed to the rotary shaft, an outer rim spaced apart from the inner rim, and a rolling member disposed between the inner rim and the outer rim. The bearing housing portion may include a hollow body in contact with an outer circumferential surface of the outer rim and a cover body formed at the hollow body, covering a portion between the inner rim and the outer rim, and facing the impeller. The bearing heat dissipation flow path may be provided in at least one of the hollow body and the cover body.

The bearing heat dissipation flow path may include a first heat dissipation flow path formed to be parallel to the rotary shaft on an inner circumferential surface of the hollow body and a second heat dissipation flow path connected to the first heat dissipation flow path, formed to be parallel to the rotary shaft in the cover body, and facing the impeller.

The bearing heat dissipation flow path may include a first heat dissipation flow path formed to be parallel to the rotary shaft on an inner circumferential surface of the hollow body and a second heat dissipation flow path connecting an outer circumferential surface of the hollow body to the first heat dissipation flow path.

The fan motor may further include: a diffuser disposed in the motor body and having an opening surrounding an outer circumferential surface of the bearing housing portion. The diffuser may have a diffuser guide flow path connecting the second heat dissipation flow path to the diffuser and the motor body.

The diffuser may have a guide vane guiding air between the diffuser and the motor body to between the rotor and the first heat dissipation flow path.

The bearing heat dissipation flow path has one end facing the rotor.

The motor body may include a motor housing having an air outlet and an impeller cover having an air intake, the impeller cover surrounding an outer circumference of the impeller. A hollow portion larger than the rotary shaft may protrude from the motor housing. A second bearing accommodated in the hollow portion may be mounted on the rotary shaft. The hollow portion may have a second bearing heat dissipation flow path through which air passes through between an outer surface of the second bearing and the hollow portion and is subsequently discharged to the outside of the hollow portion.

The second bearing may include: an inner rim fixed to the rotary shaft; an outer rim spaced apart from the inner rim; and a rolling member disposed between the inner rim and the outer rim, wherein the second bearing heat dissipation flow path includes a first heat dissipation flow path formed to be parallel to the rotary shaft on an inner circumferential surface of the hollow portion and a second heat dissipation flow path connecting an outer circumferential surface of the hollow portion and the first heat dissipation flow path.

Advantageous Effect

According to the embodiment of the present invention, air blown from the impeller may come into direct contact with the outer surface of the bearing to absorb heat of the bearing, while passing through the bearing heat dissipation flow path, thus obtaining high heat dissipation performance as compared with a case where heat of the bearing is absorbed to air through a heat sink surrounding the bearing.

MODE FOR INVENTION

Hereinafter, embodiments of the present invention will be described in detail with reference to the accompanying drawings.

Figure 1:
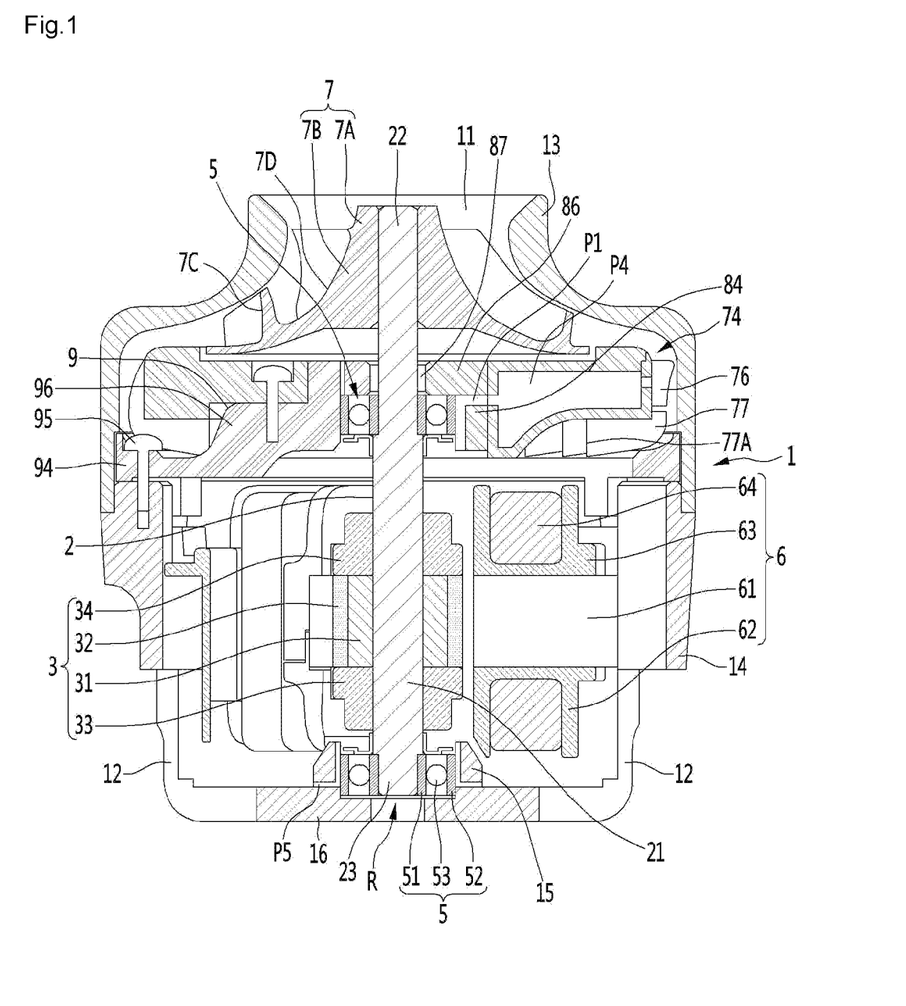
FIG. 1 is a longitudinal cross-sectional view illustrating a fan motor according to an embodiment of the present invention.
Figure 2:
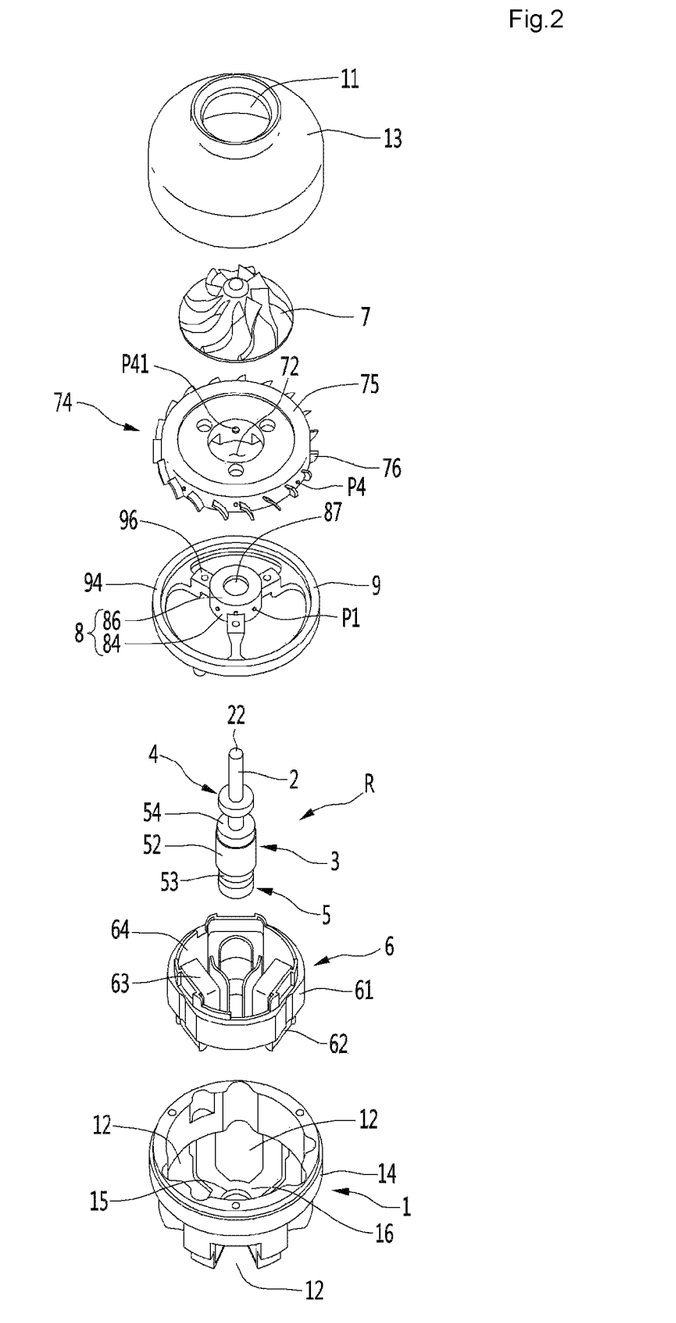
FIG. 2 is an exploded perspective view illustrating a fan motor according to an embodiment of the present invention.
Figure 3:
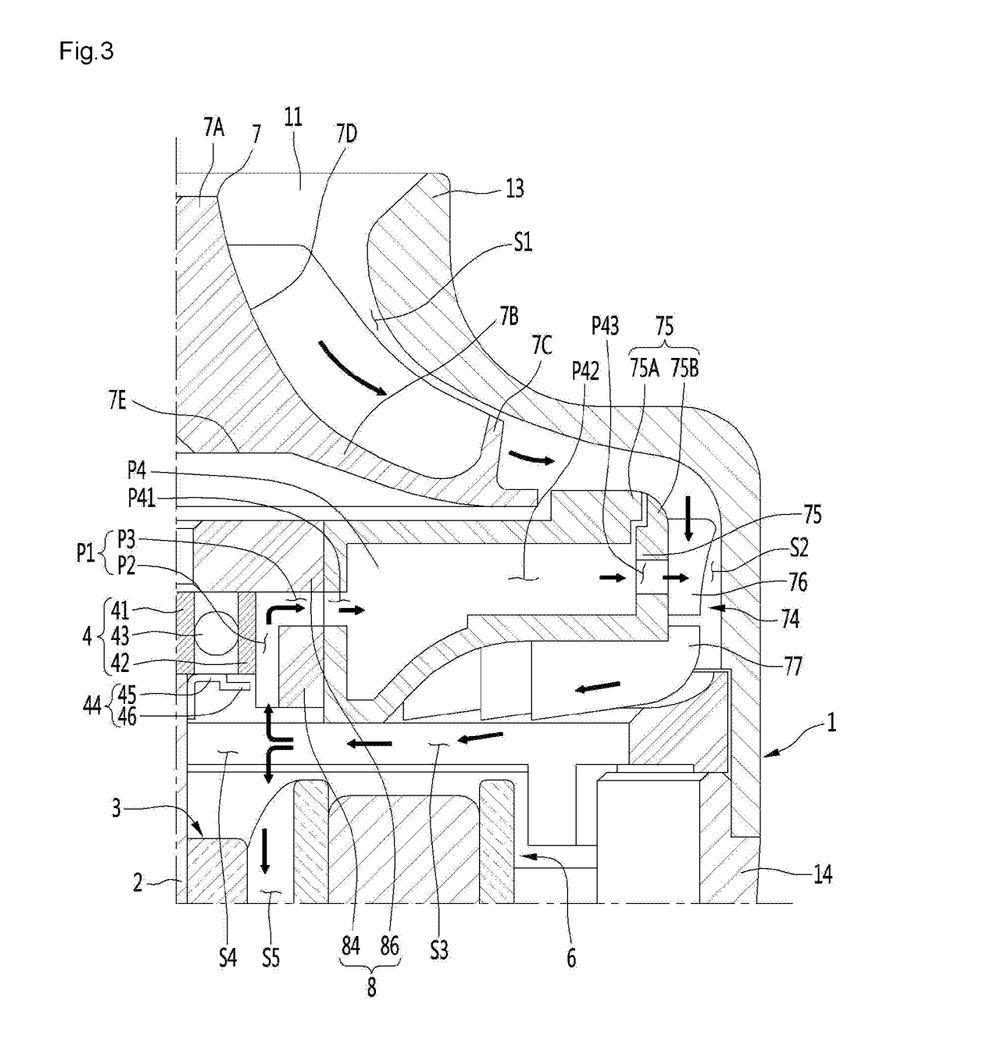
FIG. 3 is a view illustrating an air flow around a bearing according to an embodiment of the present invention.
Figure 4:
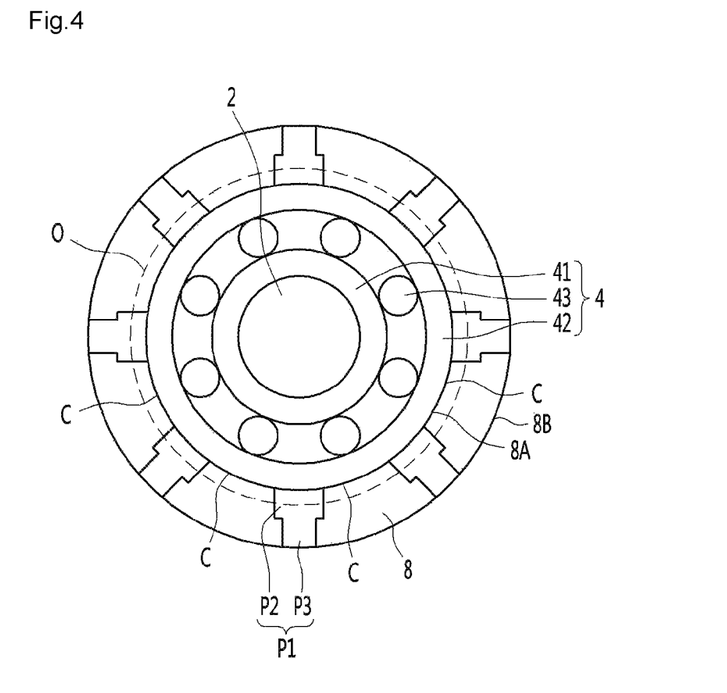
FIG. 4 is a cross-sectional view illustrating a bearing housing portion and a bearing according to an embodiment of the present invention.

FIG. 1 is a longitudinal cross-sectional view illustrating a fan motor according to an embodiment of the present invention, FIG. 2 is an exploded perspective view illustrating a fan motor according to an embodiment of the present invention, FIG. 3 is a view illustrating an air flow around a bearing according to an embodiment of the present invention, and FIG. 4 is a cross-sectional view illustrating a bearing housing portion and a bearing according to an embodiment of the present invention.

The fan motor of the present embodiment may include a motor body 1, a rotary shaft 2, a rotor 3, a bearing 4, a stator 6, and an impeller 7, and may include a bracket 9 in which a bearing housing portion 8 is formed.

As illustrated in FIG. 3, in the fan motor, air moved by the impeller 7 and blown to the vicinity of the stator 6 passes through between the bearing 4 and the bearing housing portion 8 to directly cool the bearing 4 in an air-cooling manner, and the air which has dissipated heat of the bearing 4 may flow out of the bearing housing portion 8.

In the fan motor, a bearing heat dissipation flow path P1 through which air passes may be formed between an outer surface of the bearing 4 and an inner surface of the bearing housing portion 8. Heat of the bearing 4 may be transferred to the bearing heat dissipation flow path P1 and the bearing housing portion 8. Air blown from the impeller 7 may flow into the bearing heat dissipation flow path P1 and pass therethrough. While passing through the bearing heat dissipation flow path P1, the air may be in contact with each of an outer surface of the bearing 4 and the bearing housing portion 8 to dissipate heat of the bearing 4 and the bearing housing portion 8.

The air which has absorbed the heat of the bearing 4 and the heat of the bearing housing portion 8 may escape from the bearing heat dissipation flow path P1 to the outside of the bearing housing portion 8 and may flow to the stator 6 and the rotor 3 to dissipate heat of the stator 6 and the rotor 3.

The motor body 1 may form an appearance of the fan motor. The motor body 1 may include an air intake port 11 through which ambient air of the fan motor is intaken into the motor body 1.

The motor body 1 may have an internal space. The rotary shaft 2, the rotor 3, the stator 6, the impeller 7 and the bracket 9 may be accommodated in the space of the motor body 1.

The motor body 1 may have an air discharge port 12 through which air inside the fan motor is discharged to the outside of the motor body 1.

The motor body 1 may form a combination of a plurality of members. The motor body 1 may include an impeller cover 13 in which the air intake port 11 is formed. The motor body 1 may further include a motor housing 14 having the air discharge port 12 formed therein. The impeller cover 13 may be coupled with the motor housing 14 and the motor housing 14 may configure the motor body 1 together with the impeller cover 13.

The motor body 1 may further include a separate frame disposed between the impeller cover 13 and the motor housing 14 so that the impeller cover 13 and the motor housing 14 are coupled to the frame.

The impeller cover 13 may surround the outer circumference of the impeller 7. The impeller cover 13 surrounds the outer circumference of the impeller 7 to protect the impeller 7.

The impeller cover 13 may be opened on a side facing the motor housing 14. The impeller cover 13 may be disposed to cover one open side of the motor housing 14. The impeller cover 13 may be coupled to the motor housing 14 or the bracket 9 by a fastening member such as a screw or may be screwed thereto.

The air intake port 11 may be formed to be smaller than a surface of the impeller cover 13 facing the motor housing 14.

An inner circumferential surface of the impeller cover 13 may be spaced apart from the impeller 7 and air moved by the impeller 7 may flow between the inner circumferential surface of the impeller cover 13 and the impeller 7.

The motor housing 14 may have a hollow cylinder shape in which one side is open. The motor housing 14 may have the air discharge port 12 through which internal air is discharged to the outside. A plurality of air discharge ports 12 may be formed in the motor housing 14.

The rotor 3 and the bearing 4 may be mounted on the rotary shaft 2 and the rotary shaft 2 may constitute a rotary shaft assembly R together with the rotor 3 and the bearing 4.

The rotary shaft 2 may extend from the inside the motor housing 14 to the inside of the impeller cover 13. A portion of the rotary shaft 2 may be positioned inside the motor housing 14 and the remainder of the rotary shaft 2 may be positioned inside the impeller cover 13.

The rotary shaft 2, which is rotated together with the rotor 3, may be supported by the bearing 4 and rotatably disposed inside the motor body 1. The rotary shaft 2, in a state of being supported by the bearing 4, may be rotated by the rotor 3.

An impeller 7 may be connected to the rotary shaft 2 and the impeller 7 may be rotated inside the impeller cover 13 when the rotary shaft 2 rotates.

An impeller connection portion 22 to which the impeller 7 is connected may be formed on the rotary shaft 2. The impeller connection portion 22 may be formed at a position spaced apart from a portion 21 surrounded by the rotor 3. The impeller connection portion 22 may be formed at an end portion of the rotary shaft 2 and may be positioned inside the impeller cover 13.

The rotary shaft 2 may have a second bearing mounting portion 23 on which a second bearing 5 to be described later is mounted.

The rotor 3 may be mounted to surround a portion of the rotary shaft 2. The rotor 3 may be rotatably positioned inside the stator 6. The rotor 3 may have a hollow cylindrical shape.

The rotor 3 includes a rotor core 31 fixed to the rotary shaft 2, a magnet 32 provided on the rotor core 31, and a pair of end plates 33 and 34 for fixing the magnet 32.

The rotor 3 may be mounted to surround a portion 21 between one end and the other end of the rotary shaft 2. The rotor 3 may be mounted between the impeller connection portion 22 and the second bearing mounting portion 23.

The bearing 4 may be accommodated in the bearing housing portion 8 and may support the rotary shaft 2.

The bearing 4 includes an inner rim 41 fixed to the rotary shaft 2, an outer rim 42 spaced from the inner rim 41, and a rolling member 43 disposed between the inner rim 41 and the outer rim 42.

An inner circumferential surface of the inner rim 41 may be an inner surface of the bearing 4 and an outer circumferential surface of the outer rim 42 may be an outer surface of the bearing 4.

The bearing 4 may be either a roller bearing or a ball bearing. Preferably, the rolling member 43 is configured as a ball and the bearing 4 is configured as a ball bearing having high performance for high speed rotation.

An outer diameter of the outer rim 42 of the bearing 4 may be equal to an inner diameter of the bearing housing portion 8 or slightly smaller than the inner diameter of the bearing housing portion 8.

The fan motor may further include an O-ring 44 fixed to the rotary shaft 2 and restricting the bearing 4.

The O-ring 44 may be fixed to the rotary shaft 2 and constitute a rotary shaft assembly (or a rotor assembly) together with the rotary shaft 2 and the rotor 3.

The O ring 44 may be positioned between the bearing 4 and the rotor 3 in a longitudinal direction of the rotary shaft 2 and may be a bearing stopper that restricts the bearing 4 from moving toward the rotor 3.

The O-ring 44 may be fixed to the rotary shaft 2 so as to be in contact with a portion of the bearing 4. At least a portion of the O-ring 44 may face the inner rim 41 of the bearing 4. The O-ring 44 may be in contact with the inner rim 41 of the bearing 4. The O-ring 44 may be an inner rim stopper that restricts the inner rim 41 of the bearing 4 from sliding toward the rotor 3.

An outer diameter of the O-ring 44 may be smaller than an inner diameter of the bearing housing portion 8.

The O-ring 44 may be positioned inside the bearing housing portion 8. The O-ring 44 may be rotated in an empty space formed inside the bearing housing portion 8 when the rotary shaft 2 rotates.

Preferably, a gap is formed between an outer circumference of the O-ring 44 and the bearing housing portion 8 and the O-ring 44 and the bearing housing portion 8 are not in contact with each other. At least one of the O-ring 44 and the bearing housing portion 8 may be worn if the O-ring 44 and the bearing housing portion 8 are in contact with each other. If the O-ring 44 and the bearing housing portion 8 are not in contact with each other, the life of each of the O-ring 44 and the bearing housing portion 8 may be maximized.

The O-ring 44 may be mounted on the rotary shaft 2, may be in contact with the inner rim 41 of the bearing 4, and may be spaced apart from the bearing housing portion 8.

The O-ring 44 may include an inner ring 45 in contact with the inner rim 41 of the bearing 4 and an outer ring 46 spaced apart from the outer rim 42 of the bearing 4. An outer circumference of the outer ring 46 may be an outer circumference of the O-ring 44 and an outer diameter of the outer ring 46 may be an outer diameter of the O-ring 44.

The O-ring 44 may have a size that does not shield a bearing heat dissipation flow path P1. A plurality of bearing heat dissipation flow paths P1 may be formed on an inner circumferential surface of the bearing housing portion 8. The plurality of bearing heat dissipation flow paths P1 may be spaced apart from each other along an inner circumferential surface of the bearing housing portion 8. The virtual circle O connecting the centers of the plurality of bearing heat dissipation flow paths P1 may be larger than the inner circumferential surface of the bearing housing portion 8, and the outer circumference of the O-ring may smaller than the virtual circle O connecting the centers of the plurality of bearing heat dissipation flow paths P1.

In the fan motor, a portion of the rotary shaft 2 positioned inside the motor housing 14 may be directly supported by the motor housing 14.

When the rotary shaft 2 is directly supported by the motor housing 14, the motor housing 14 may have a rotary shaft support portion for rotatably supporting the rotary shaft 2. The rotary shaft support portion may surround the outer circumference of the rotary shaft 2 in the motor housing 14. At least one of the rotary shaft 2 and the rotary shaft support portion may be provided with a lubricant medium such as a lubricant for preventing wear between the rotary shaft 2 and the rotary shaft support portion.

In the fan motor, a portion of the rotary shaft 2 positioned inside the motor housing 14 may be supported by the second bearing 5. The fan motor may further include the second bearing 5 installed on the rotary shaft 2 and the second bearing 5 may rotatably support the rotary shaft 2.

The second bearing 5 may be installed on the rotary shaft 2 and spaced apart from the bearing 4. The second bearing 5 may be spaced apart from the bearing 4 in a longitudinal direction of the rotary shaft 2.

The bearing 4 and the second bearing 5 may rotatably support the rotary shaft 2 at positions spaced apart from each other. In this case, a load of the rotary shaft 2 may be distributed to and acted on the bearing 4 and the second bearing 5.

In the fan motor, the bearing 4 and the second bearing 5 may be mounted together between the rotor 3 and the impeller 7. In this case, the bearing 4 and the second bearing 5 may be mounted to be spaced apart from each other in an axial direction of the rotary shaft 2 at positions between the rotor 3 and the impeller 7.

Meanwhile, in the fan motor, the bearing 4 and the second bearing 5 may be mounted to be spaced apart from each other with the rotor 3 interposed therebetween. In this case, the bearing 4 and the second bearing 5 may support the rotary shaft 2 by efficiently distributing a load acting on the rotary shaft 2. When the bearing 4 and the second bearing 5 are disposed with the rotor 3 interposed therebetween, a maximum load acting on the bearing 4 and the second bearing 5 may be smaller than that when the bearing 4 and the second bearing 5 are mounted together between the rotor 3 and the impeller 7, and a service life of the bearing 4 and the second bearing 5 may be longer than that of a case where the bearing 4 and the second bearing 5 are mounted together between the rotor 3 and the impeller 7. Also, when the bearing 4 and the second bearing 5 are spaced apart from each other with the rotor 3 interposed therebetween, the fan motor does not require a separate space for separating the bearing 4 and the second bearing 5, and thus, the fan motor may become compact, relative to a case where the bearing 4 and the second bearing 5 are positioned together between the rotor 3 and the impeller 7.

The second bearing 5 may be positioned between the rotary shaft 2 and the motor housing 14 to support the rotary shaft 2. In this case, the second bearing 5 may be spaced apart from the bearing 4 with the rotor 3 interposed therebetween.

When the fan motor includes both the bearing 4 and the second bearing 5, the bearing 4 may be a load side bearing closer to the impeller 7, and the second bearing 5 may be a half load side bearing farther from the impeller 7.

When the fan motor includes both the bearing 4 and the second bearing 5, the bearing 4 may be a bracket bearing surrounded and supported by the bracket 9, and the bearing 5 may be a motor housing bearing surrounded and supported by the motor housing 14.

The bearing 4 may be a first bearing mounted between the impeller 7 and the second bearing 5, in particular, between the impeller 7 and the rotor 3.

The second bearing 5 may be an end bearing mounted on the opposite end of the impeller 7 in the rotary shaft 2.

Figure 5:
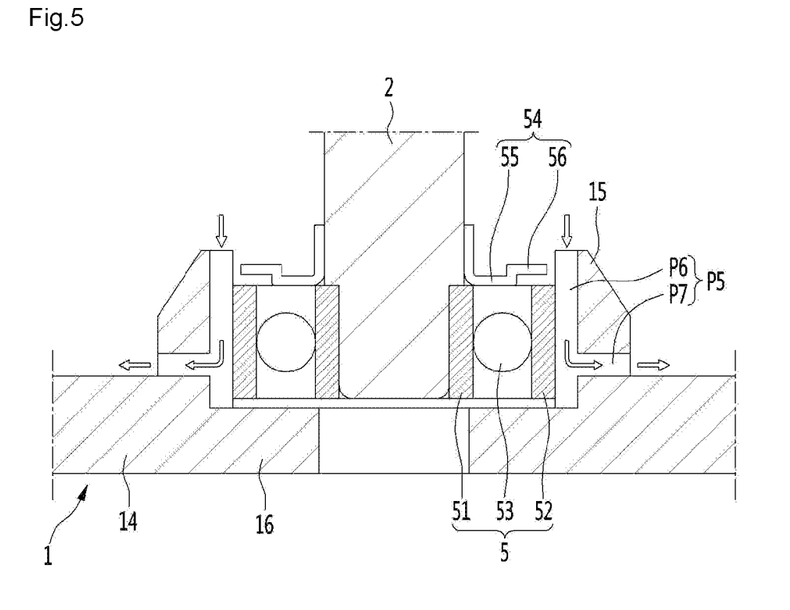
FIG. 5 is a view illustrating an air flow around a second bearing according to an embodiment of the present invention.

When the rotary shaft 2 is supported by the second bearing 5, the second bearing 5 may be mounted on the rotary shaft 2 so as to be positioned inside the motor housing 14. The motor housing 14 may have a hollow portion 15 larger than the rotary shaft 2. The motor housing 14 may include a body portion 16 in which the hollow portion 15 protrudes.

The hollow portion 15 may be provided larger than the second bearing 5. The second bearing 5 may be supported directly on the motor housing 14 or on the motor housing 14 with a separate elastic member therebetween.

When the second bearing 5 is directly supported by the motor housing 14, an outer circumferential surface of the second bearing 5 may be in contact with the motor housing 14. The second bearing 5 will be described later in detail.

The stator 6 may be mounted on the motor body 1. The stator 6 may be mounted on the motor housing 14 and may be installed to surround the rotor 3 in the motor housing 14. The stator 6 may be mounted on the motor housing 14 by a fastening member such as a screw. The stator 6 may have a hollow cylindrical shape. The stator 6 may be mounted so as to surround an outer circumference of the rotor 3.

The stator 6 may include a combination of a plurality of members. The stator 6 may include a stator core 61, a pair of insulators 62 and 63 coupled to the stator core 61, and a coil 64 disposed in the insulators 62 and 63.

The impeller 7 may be connected to the rotary shaft 2. The impeller 7, in a state of being connected to the rotary shaft 2, may be rotated together with the rotary shaft 2. The impeller 7 may be positioned between the impeller cover 13 and a diffuser 74 described below. A gap S1 through which air moved by the impeller 7 passes may be formed between the impeller 7 and the impeller cover 13. The gap S1 may be formed between an outer circumferential surface of the impeller 7 and an inner surface of the impeller cover 13.

The impeller 7 may include a rotary shaft connection portion 7A connected to the rotary shaft 2, a blade base 7B gradually expanding toward the rotor from the rotary shaft connection portion 7A, and a plurality of blades 7C formed on the blade base 7B.

The impeller 7 may include an air intake port facing surface 7D facing the air intake port 11 and a diffuser facing surface 7E facing the diffuser 74 as described below.

The impeller 7 may be rotated between the air intake port 11 and the diffuser 74 to intake air into the air intake port 11 and blow air between the diffuser 74 and the motor body 1.

The fan motor may further include a diffuser 74 for guiding air moved by the impeller 7. The air moved by the impeller 7 may be guided by the diffuser 74, and the air guided by the diffuser 74 may dissipate heat of the bearing 4, while passing through the bearing heat dissipation flow path P1 between the bearing 4 and the bearing housing portion 8. The air blown from the impeller 7 may flow between the bearing housing portion 8 and the rotor 3 by the diffuser 74, and the air between the bearing housing portion 8 and the rotor 3 may flow into the bearing heat dissipation flow path P1 formed in the bearing housing portion 8 to pass through the bearing heat dissipation flow path P1 and flow out of the bracket 9 from the bearing heat dissipation flow path P1.

The diffuser 74 may be disposed inside the impeller cover 13. The diffuser 74 may be mounted on at least one of the impeller cover 13 and the bracket 9. A gap S2 through which air guided to the diffuser 74 may pass may be formed between the diffuser 74 and the impeller cover 13.

A portion of the diffuser 74 may face the impeller 7 and a gap may be formed between one surface of the diffuser 74 and the diffuser facing surface 7E of the impeller 7.

The diffuser 74 may be disposed inside the motor body 1. The diffuser 74 may have an opening 72 surrounding an outer circumferential surface of the bearing housing portion 8.

The diffuser 74 may have a diffuser guide flow path P4 allowing the bearing heat dissipation flow path P1 to communicate with the diffuser 74 and the motor body 1.

The diffuser guide flow path P4 may be formed to communicate with a portion of the bearing heat dissipation flow path P1. The diffuser guide flow path P4 may communicate with the second heat dissipation flow path P3 (to be described) of the bearing heat dissipation flow path P1.

The diffuser 74 may include a body portion 75 smaller than the impeller cover 13 and positioned inside the impeller cover 13 and a diffuser vane 76 protruding from an outer circumference of the body portion 75.

The body portion 75, in a state of being positioned between the impeller 7 and the stator 6, may guide air blown in a centrifugal direction from the impeller 7 to an inner surface of the motor body 1, and the air passing between the outer circumferential surface of the body portion 75 and the inner surface of the motor body 1 may be guided between the body portion 75 and the stator 6.

The body portion 75 may have a shape of an annular plate having an opening 72 formed at the center thereof. The diffuser guide flow path P4 may penetrate through the body portion 75 and may connect the outer circumferential surface of the body portion 75 to the opening. The diffuser guide flow path P4 may extend in the body portion 75 in a radial direction.

The body portion 75 may be configured as a single member or may be configured as a combination of a plurality of members.

In case that the body portion 75 includes a plurality of members, the body portion 75 may include an impeller facing body portion 75A facing the impeller 7 and a stator facing body portion 75B coupled to the impeller facing body and facing the stator 6.

An inlet P41 of the diffuser guide flow path P4 may be formed in the opening 72 of the body portion 75. The body portion 75 may have a space P42 between the impeller facing body portion 75A and the stator facing body portion 75B and allowing air guided to the inlet P41 to pass therethrough. An outlet P43, through which the air passing through the space P42 is discharged between the body portion 75 and the impeller cover 13, may be formed on an outer circumferential surface of the body portion 75.

The diffuser vane 76 may protrude from the body portion 75 so as to be positioned between the body portion 75 and the impeller cover 13. The diffuser vane 76 may convert a dynamic pressure of the air passing through the impeller 7 into a static pressure.

The diffuser 74 may further include a guide vane 77 for guiding air to the periphery of the bearing heat dissipation flow path P1. The guide vane 77 may be formed after the diffuser vane 76 in an air flow direction. The guide vane 77 may guide the air moved by the diffuser vane 76. The guide vane 77 may protrude from the body portion 75 toward the stator 6 and a trailing edge 77A thereof may face the bearing housing portion 8.

The guide vane 77 may guide air between the diffuser 74 and the motor body 1 to between the rotor 3 and the first heat dissipation flow path P2. The guide vane 77 may guide air having a pressure raised by the diffuser vane 76 toward at least one of the bearing housing portion 8 and the rotor 3. The guide vane 77 may guide air toward a gap S4 between the bearing housing portion 8 and the rotor 3.

The air guided to the guide vane 77 may pass through a gap S3 between the diffuser 74 and the stator 6 and the air may pass through the gap S4 between the bearing housing portion 8 and the rotor 3.

A portion of the air moved by the guide vane 77 may flow to the bearing housing portion 8 and pass through the bearing heat dissipation flow path P1 and dissipate heat of the bearing 4, the bearing housing portion 8, and the bracket 9. Air, which is moved by the vane 77 but does not flow to the bearing housing portion 8, may flow to a gap S5 between the rotor 3 and the stator 6 to dissipate heat of the rotor 3 and the stator 6.

The bearing housing portion 8 may have the bearing heat dissipation flow path P1 through which air is exhausted to the outside of the bearing housing portion 8 after passing through between the outer surface of the bearing 4 and the bearing housing portion 8.

The bearing heat dissipation flow path P1 may be formed on the inner circumferential surface of the bearing housing portion 8. The bearing heat dissipation flow path P1 may be formed to be depressed on the inner circumferential surface of the bearing housing portion 8. The bearing heat dissipation flow path P1 may be formed such that a surface thereof facing the outer rim 42 of the bearing 4 is open. The bearing heat dissipation flow path P1 may be a groove formed in the bearing housing portion 8 to allow air to flow therein. The bearing heat dissipation flow path P1 may be formed to be in contact with an outer circumferential surface of the outer rim 42 of the bearing 4. The bearing heat dissipation flow path P1 may be formed between the outer rim 42 of the bearing 4 and the bearing housing portion 8 and have a shape of a cylinder or a quadrangular prism in a cross-section thereof.

The bearing heat dissipation flow path P1 may be provided in plurality in the bearing housing portion 8.

The bearing housing portion 8 may have a plurality of contact surfaces C in contact with an outer surface of the bearing 4 between the plurality of bearing heat dissipation flow paths P1. The plurality of contact surfaces C and the plurality of bearing heat dissipation flow paths P1 may be alternately formed along the inner circumferential surface of the bearing housing portion 8.

The bearing heat dissipation flow path P1 may include a first heat dissipation flow path P2 formed on an inner circumferential surface 8A of the bearing housing portion 8 in parallel with the rotary shaft 2 and a second heat dissipation flow path P3 connecting an outer circumferential surface 8B of the bearing housing portion 8 to the first heat dissipation flow path P2.

A plurality of first heat dissipation flow path P2 may be formed along the inner circumferential surface of the bearing housing portion 8.

A plurality of the second heat dissipation flow paths P3 may be radially formed about the rotary shaft 2 in the bearing housing portion 8.

The second heat dissipation flow path P3 may be bent in a direction perpendicular to a longitudinal direction of the first heat dissipation flow path P2 at one end of the first heat dissipation flow path P2.

The bearing housing portion 8 may include a hollow body 84 with which an outer circumferential surface of the outer rim 42 is in contact. The bearing housing portion 8 may further include a cover body 86 formed in the hollow body 84, covering a gap between the inner rim 41 and the outer rim 42, and facing the impeller 7.

The hollow body 84 may be inserted into the opening 72 of the diffuser 74 and the other outer circumferential surface thereof may be surrounded by the opening 72 of the diffuser 74.

The cover body 86 may have a rotary shaft through hole 87 through which the rotary shaft 2 is rotatably inserted. One side of the cover body 86 may face the diffuser facing surface 7E of the impeller 7 and a gap may be formed between the cover body 86 and the impeller 7.

The bearing heat dissipation flow path P1 may be formed in at least one of the hollow body 84 and the cover body 86.

An inner circumferential surface of the hollow body 84 may be an inner circumferential surface of the bearing housing portion 8. An outer circumferential surface of the hollow body 84 may be an outer circumferential surface of the bearing housing portion 8.

Both the first heat dissipation flow path P2 and the second heat dissipation flow path P3 of the bearing heat dissipation flow path P1 may be formed in the hollow body 84. In this case, the bearing heat dissipation flow path P1 includes a first heat dissipation flow path P2 formed on the inner circumferential surface of the hollow body 84 in parallel with the rotary shaft 2 and a second heat dissipation flow path P3 connecting the outer circumferential surface of the hollow body 84 and the first heat dissipation flow path P2.

The bearing heat dissipation flow path P1 may have one end facing the rotor 3 or facing a gap between the rotor 3 and the stator 6. One longitudinal end of the first heat dissipation flow path P2 may face the rotor 3 or face a gap between the rotor 3 and the stator 6.

Referring to FIG. 4, the air guided by the diffuser 74 to between the bearing heat dissipation flow path P1 and the rotor 3 may be distributed to the bearing heat dissipation flow path P1 and the rotor 3.

The bracket 9 may be installed in the motor body 1. The bracket 9 may be coupled to at least one of the motor housing 14, the impeller cover 13, and the diffuser 74. The bracket 9 may have the bearing housing portion 8 for accommodating the bearing 4.

The bracket 9 may include a fastening portion 94 fastened to at least one of the motor housing 14 and the impeller cover 13 by a fastening member 95. The bracket 9 may include at least one connection portion 96 connecting the fastening portion 94 to the bearing housing portion 8.

FIG. 5 is a view illustrating an air flow around a second bearing according to an embodiment of the present invention.

The hollow portion 15 larger than the rotary shaft 2 may protrude from the motor housing 14. The hollow portion 15 may protrude from the body portion 16 of the motor housing 14 toward the rotor 3.

A second bearing 5 accommodated in the hollow portion 15 may be mounted on the rotary shaft 2.

The second bearing 5 may include an inner rim 51 fixed to the rotary shaft 2, an outer rim 52 spaced apart from the inner rim 51, and a rolling member 53 disposed between the inner rim 51 and the outer rim 52.

The second bearing 5 may be either a roller bearing or a ball bearing, and, preferably, the rolling member 53 is configured as a ball and the second bearing 5 is configured as a ball bearing having high performance for high speed rotation.

An inner rim 51 of the second bearing 5 may be fixed to the rotary shaft 2 and an outer rim 52 of the second bearing 5 may be in contact with the hollow portion 15 and fixed to the hollow portion 15.

The outer rim 52 of the second bearing 5 may be in contact with an inner circumferential surface of the hollow portion 15.

The fan motor may further include a second O-ring 54 fixed to the rotary shaft 2 and supporting the second bearing 5. The second O-ring 54 may be fixed to the rotary shaft 2 and constitute a rotary shaft assembly (or a rotor assembly) together with the rotary shaft 2 and the rotor 3.

The second O-ring 54 may be positioned between the second bearing 5 and the rotor 3 in the longitudinal direction of the rotary shaft 2 and may be a second bearing stopper for restricting movement of the second bearing 5 toward the rotor 3.

The second O-ring 54 may be fixed to the rotary shaft 2 so as to be in contact with a portion of the second bearing 5. At least a portion of the second O-ring 54 may face the inner rim 51 of the second bearing 5. The second O-ring 54 may be in contact with the inner rim 51 of the second bearing 5. The second O-ring 54 may be a bearing stopper for restricting sliding of the inner rim 51 of the second bearing 5 toward the rotor 3.

The second O-ring 54 may be mounted on the rotary shaft 2, may be in contact with the inner rim 51 of the second bearing 5, and may be spaced apart from the hollow portion 15.

The second O-ring 54 may include an inner ring 55 in contact with the inner rim 51 of the second bearing 5 and an outer rim 56 spaced apart from the outer rim 64 of the second bearing 5.

The fan motor may have a second bearing heat dissipation flow path P5 formed in the hollow portion 15, through which air passing through between the outer surface of the second bearing 5 and the hollow portion 15 is exhausted to the outside of the hollow portion 15.

The second bearing heat dissipation flow path P5 may include a first heat dissipation flow passage P6 formed on the inner circumferential surface of the hollow portion 15 in parallel to the rotary shaft 2 and a second heat dissipation flow passage P7 formed on the outer circumferential surface of the hollow portion 15 and connecting the outer circumferential surface of the hollow portion 15 to the first heat dissipation flow passage P6.

Hereinafter, the operation of the present embodiment will be described.

First, when the fan motor is driven, the rotary shaft 2 may be rotated and the impeller 7 may be rotated together with the rotary shaft 2. When the impeller 7 is rotated, the air outside the fan motor may be intaken by the impeller 7 through the air intake port 11.

The air intaken by the impeller 7 may flow to the diffuser 74 by the impeller 7 and the air which has flowed to the diffuser 74 may be guided by the diffuser 74 to pass through the gap S2 between the diffuser 74 and the impeller cover 13. The air guided to the diffuser 74 may be guided sequentially by the diffuser vane 76 and the guide vane 77.

The air guided by the guide vane 77 may pass through the gap S3 between the diffuser 74 and the stator 6. A portion of the air which has passed through the gap S3 between the diffuser 74 and the stator 6 passes through the gap S4 between the bearing housing portion 8 and the rotor 4 and flows into the bearing heat dissipation flow path P1. Meanwhile, the rest of the air which has passed through the gap S3 between the diffuser 74 and the stator 6 may flow into the gap S5 between the rotor 4 and the stator 6.

The air which has flowed into the bearing heat dissipation flow path P1 may come into direct contact each of the outer rim 42 of the bearing 4 and the bearing housing portion 8, while passing through the bearing heat dissipation flow path P1, to absorb heat of each of the outer rim 42 of the bearing 4 and the bearing housing portion 8.

The air flowing into the first heat dissipation flow path P2 of the bearing heat dissipation flow path P1 may flow in a direction of toward the impeller 7 to absorb heat of each of the outer rim 42 of the bearing 4 and the bearing housing portion 8. The air which has absorbed heat, while passing through the first heat dissipation flow path P2 of the bearing heat dissipation flow path P1 may be changed in a flow direction to the second heat dissipation flow path P3 of the bearing heat dissipation flow path P1 and absorb heat again from the bearing housing portion 8, while passing through the second heat dissipation flow path P3 of the bearing heat dissipation flow path P1.

The air which has passed through the second heat dissipation flow path P3 may radially escape from the bearing housing portion 8 and pass through the diffuser guide flow path P4 communicating with the second heat dissipation flow path P3. The air which has passed through the diffuser guide flow path P4 may flow into the gap S2 between the diffuser 74 and the impeller cover 13 and the air which has absorbed heat of the bearing 4 and the bearing housing portion 8 may be mixed with the air flowing from the impeller 7. The mixed air may be guided to the diffuser 74 and blown into the gap S3 between the diffuser 74 and the stator 6.

Meanwhile, air may flow into the gap S5 between the rotor 4 and the stator 6, absorb heat of the rotor 4 and the stator 6, while passing through the gap S5, and may escape from the gap S5 between the rotor 4 and the stator 6.

As described above, the air which has escaped from the gap S5 between the rotor 4 and the stator 6 may be exhausted to the outside of the motor body 1 through the air discharge port 12.

Meanwhile, a portion of the air which has escaped from the gap S5 between the rotor 4 and the stator 6 may flow into the second bearing heat dissipation flow path P5 between the second bearing 5 and the hollow portion 15 and may absorb heat of the second bearing 5 and the hollow portion 15, while passing through the second bearing heat dissipation flow path P5.

The air flowing into the first heat dissipation flow passage P6 of the second bearing heat dissipation flow path P5 flows in a direction away from the impeller 7 to absorb heat each of the outer rim 52 of the second bearing 4 and the hollow portion 15. The air which has absorbed heat, while passing through the first heat dissipation flow passage P6 of the second bearing heat dissipation flow path P5, may be changed in a flow direction to the second heat dissipation flow passage P7 of the second bearing heat dissipation flow path P5 and absorb again heat of the hollow portion 15, while passing through the second heat dissipation flow passage P7 of the second bearing heat dissipation flow path P5.

As described above, the air which has passed through the second bearing heat dissipation flow path P5 may flow out in a radial direction of the hollow portion 15 and may be exhausted to the outside of the motor body 1 through the air discharge port 12.

Figure 6:
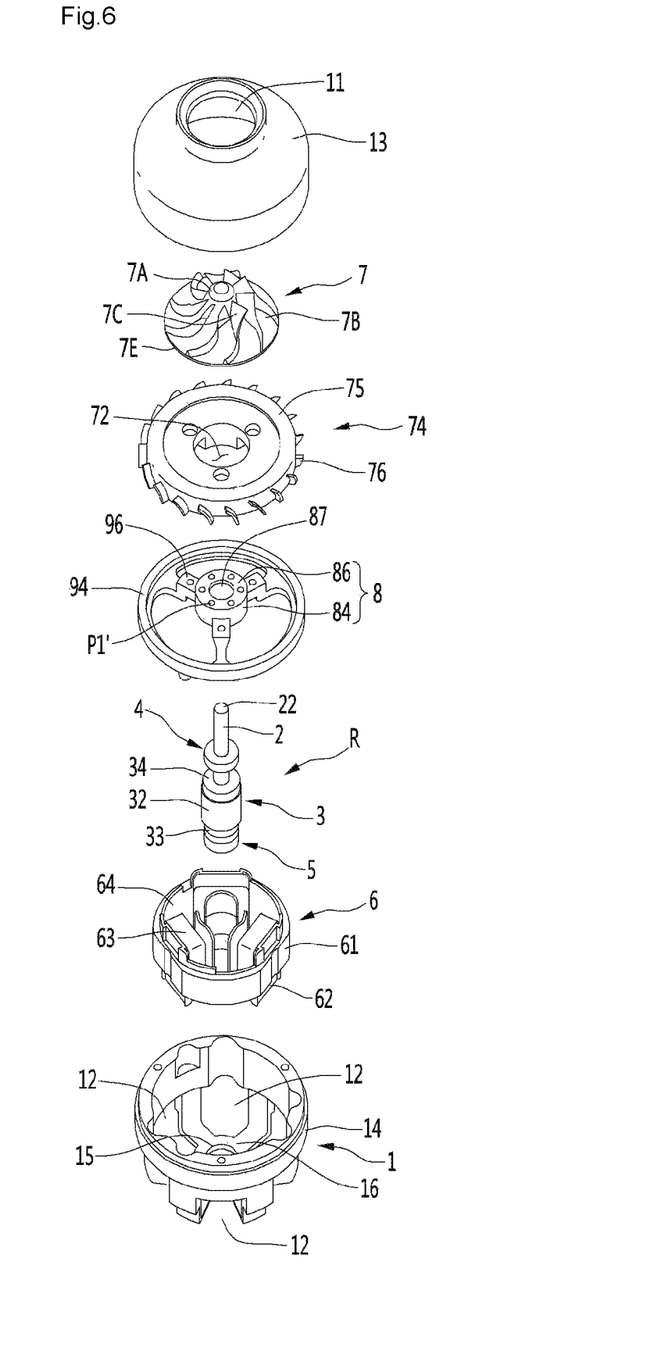
FIG. 6 is an exploded perspective view illustrating a fan motor according to another embodiment of the present invention.
Figure 7:
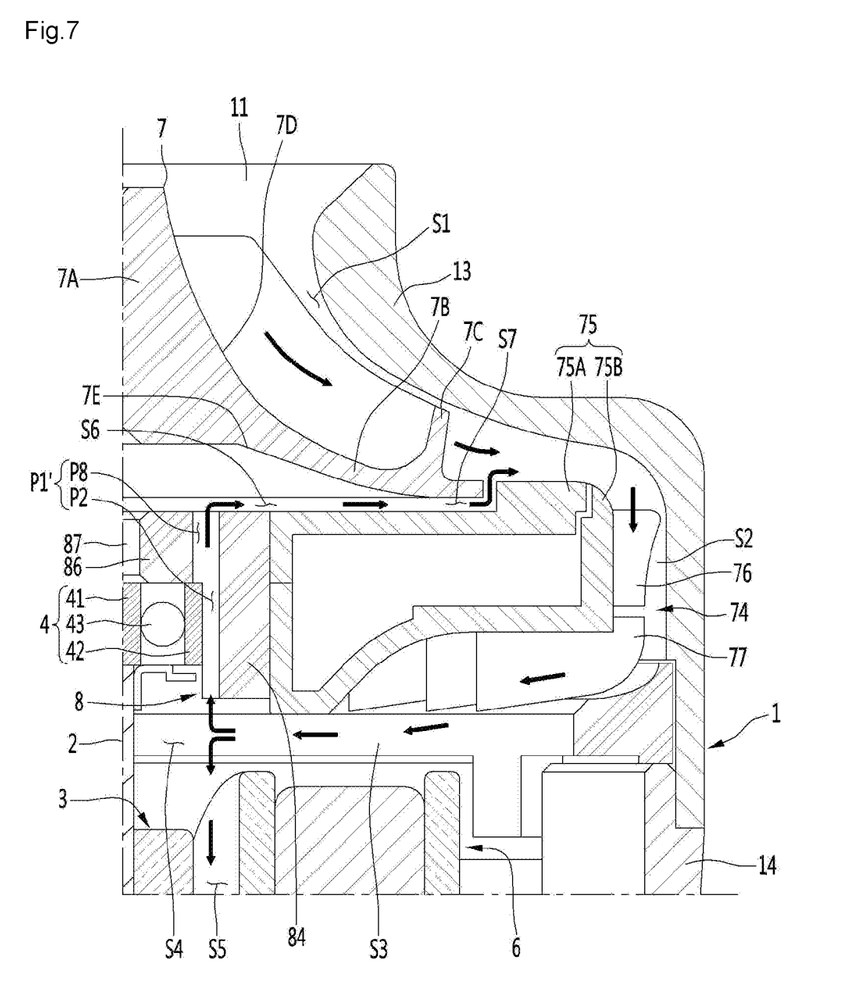
FIG. 7 is a view illustrating an air flow around a bearing according to another embodiment of the present invention.
Figure 8:
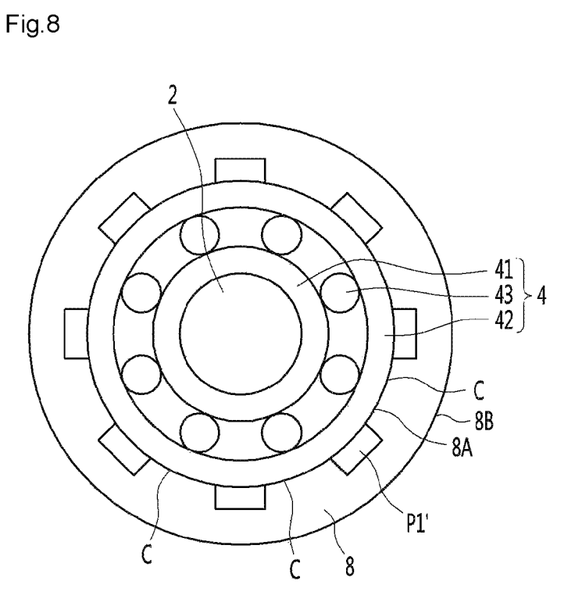
FIG. 8 is a cross-sectional view illustrating a bearing housing portion and a bearing according to another embodiment of the present invention.

FIG. 6 is a cross-sectional view illustrating an inside of a fan motor according to another embodiment of the present invention, FIG. 7 is a view illustrating an air flow around a bearing according to another embodiment of the present invention, and FIG. 8 is a cross-sectional view illustrating a bearing housing portion and a bearing according to another embodiment of the present invention are shown.

In this embodiment, a bearing heat dissipation flow path P1' formed in the bearing housing portion 8 of the bracket 9 may be formed in parallel with the rotary shaft 2 in the bearing housing portion 8.

The bearing housing portion 8 may include the hollow body 84 and the cover body 86 as in the embodiment described above and the bearing heat dissipating path P1' may include a first heat dissipation flow path P2 formed in parallel to the rotary shaft 2 on the inner circumferential surface of the hollow body 84 and a second heat dissipation flow path P3 connected to the first heat dissipation flow path P2, formed in parallel with the rotary shaft 2 in the cover body 86, and facing the impeller 7.

The present embodiment is the same as or similar to the embodiment of the present invention described above in components other than the second heat dissipation flow path 8 and operation, and thus, the same reference numerals are used and a detailed description thereof will be omitted.

As in the embodiment of the present invention described above, the air intaken into the first heat dissipation flow path P2 of the bearing heat dissipation flow path P' is brought into contact with each of the bearing 4 and the bearing housing portion 8 to directly cool the bearing 4 and the bearing housing portion 8 by air cooling.

As illustrated in FIG. 7, the air which has absorbed heat of the bearing 4 and the bearing housing portion 8 in the first heat dissipation flow path P2 of the bearing heat dissipation flow path P1' may flow into the second heat dissipation flow path P8 and flow in a direction toward the impeller 7, and the second heat dissipation flow path P8 may guide the air which has dissipated heat from the bearing 4 to between the impeller 7 and the cover body 86.

The air which has escaped from the second heat dissipation flow path P8 may pass through a gap S6 between the cover body 86 and the impeller 7 and subsequently pass through a gap S7 between the diffuser 74 and the impeller 7.

The air which has passed through the gap S7 between the diffuser 74 and the impeller 7 may flow to between the diffuser 74 and the impeller cover 13 and may be mixed with the air blown from the impeller 7. The mixed air may flow to the guide vane 77 through the gap S2 between the diffuser 74 and the impeller cover 13 and may be guided by the guide vane 77 to flow to between the rotor 3 and the first heat dissipation flow path P2.

The above description is only an example describing a technological scope of the present invention. Various changes, modifications, and replacements may be made by those skilled in the art without departing from the spirit and scope of the present invention.

Therefore, the embodiments disclosed above and in the accompanying drawings should be considered in a descriptive sense only and not for limiting the technological scope. The technological scope of the present invention is not limited by the embodiments and the accompanying drawings.

The spirit and scope of the present invention should be interpreted by the appended claims and encompass all equivalents falling within the scope of the appended claims.

The invention claimed is:

1. A fan motor comprising:
    a motor body that defines an accommodation space therein;
    a rotary shaft assembly disposed in the accommodation space, the rotary shaft assembly comprising a rotary shaft, a rotor disposed on the rotary shaft, and a bearing disposed on the rotary shaft;
    a stator that surrounds an outer circumference of the rotor and that is disposed in the accommodation space of the motor body;
    an impeller connected to the rotary shaft; and
    a bracket that is disposed in the accommodation space of the motor body and that comprises a bearing housing portion that accommodates the bearing,
    wherein the bearing housing portion defines a bearing heat dissipation flow path that is configured to guide an air moved by the impeller through a space defined between the bearing housing portion and an outer circumferential surface of the bearing and that is configured to discharge the air to an outside of the bearing housing portion,
    wherein the bearing heat dissipation flow path comprises a plurality of bearing heat dissipation flow paths that is disposed at the bearing housing portion and spaced apart from one another along the outer circumferential surface of the bearing, and
    wherein an inner circumferential surface of the bearing housing portion defines a plurality of contact surfaces that is in contact with the outer circumferential surface of the bearing and disposed between the plurality of bearing heat dissipation flow paths, the plurality of contact surfaces being spaced apart from one another in a circumferential direction of the bearing housing portion.

2. The fan motor of claim 1, wherein a portion of the bearing heat dissipation flow path in the bearing housing portion extends in a direction that is parallel to the rotary shaft.

3. The fan motor of claim 1, wherein the bearing heat dissipation flow path comprises:
  a first heat dissipation flow path that is parallel to the rotary shaft and that extends along the inner circumferential surface of the bearing housing portion; and
  a second heat dissipation flow path that connects the first heat dissipation flow path to an outer circumferential surface of the bearing housing portion.

4. The fan motor of claim 3, wherein the second heat dissipation flow path comprises a plurality of second heat dissipation flow paths that is arranged around the rotary shaft at the bearing housing portion.

5. The fan motor of claim 1, wherein the bearing comprises:
  an inner rim fixed to the rotary shaft;
  an outer rim spaced apart from the inner rim; and
  a rolling member disposed between the inner rim and the outer rim,
  wherein the bearing housing portion comprises:
    a hollow body that is in contact with the outer circumferential surface of the bearing, and
    a cover body that is disposed at the hollow body, that covers a portion of the bearing between the inner rim and the outer rim, and that faces the impeller, and
  wherein the bearing heat dissipation flow path is defined in at least one of the hollow body or the cover body.

6. The fan motor of claim 5, wherein the bearing heat dissipation flow path comprises:
  a first heat dissipation flow path that is parallel to the rotary shaft and that extends along an inner circumferential surface of the hollow body; and
  a second heat dissipation flow path that is connected to the first heat dissipation flow path, that is parallel to the rotary shaft in the cover body, and that faces the impeller.

7. The fan motor of claim 5, wherein the bearing heat dissipation flow path comprises:
  a first heat dissipation flow path that is parallel to the rotary shaft and that extends along an inner circumferential surface of the hollow body; and
  a second heat dissipation flow path that connects the first heat dissipation flow path to an outer circumferential surface of the hollow body.

8. The fan motor of claim 7, further comprising:
  a diffuser that is disposed in the accommodation space of the motor body and that defines an opening that surrounds an outer circumferential surface of the bearing housing portion,
  wherein the diffuser defines a diffuser guide flow path that connects the second heat dissipation flow path to a diffuser gap defined between the diffuser and the motor body.

9. The fan motor of claim 8, wherein the diffuser has a guide vane configured to guide the air in the diffuser gap to a rotor gap defined between the rotor and the first heat dissipation flow path.

10. The fan motor of claim 1, wherein the bearing heat dissipation flow path has an end facing the rotor.

11. The fan motor of claim 1, wherein the motor body comprises:
  a motor housing that defines an air outlet; and
  an impeller cover that defines an air intake and that surrounds an outer circumference of the impeller,
  wherein the motor housing comprises a hollow portion that surrounds an outer circumference of the rotary shaft and that protrudes from an inner surface of the motor housing,
  wherein the fan motor further comprises a second bearing accommodated in the hollow portion and mounted on the rotary shaft, and
  wherein the hollow portion defines a second bearing heat dissipation flow path that is configured to guide the air through a space defined between an outer surface of the second bearing and the hollow portion and that is configured to discharge the air to an outside of the hollow portion.

12. The fan motor of claim 11, wherein the second bearing comprises:
  an inner rim fixed to the rotary shaft;
  an outer rim spaced apart from the inner rim; and
  a rolling member disposed between the inner rim and the outer rim,
  wherein the second bearing heat dissipation flow path comprises:
    a first heat dissipation flow path that is parallel to the rotary shaft and that extends along an inner circumferential surface of the hollow portion, and
    a second heat dissipation flow path that connects the first heat dissipation flow path to an outer circumferential surface of the hollow portion.

13. The fan motor of claim 1, wherein the bearing heat dissipation flow path is defined on the inner circumferential surface of the bearing housing portion.

14. The fan motor of claim 1, wherein the bearing heat dissipation flow path faces the outer circumferential surface of the bearing in a radial direction of the bearing housing portion.

15. A fan motor comprising:
  a motor body;
  a rotary shaft assembly disposed in the motor body, the rotary shaft assembly comprising a rotary shaft, a rotor disposed on the rotary shaft, and a bearing disposed on the rotary shaft;
  a stator that is disposed in the motor body and that surrounds an outer circumference of the rotor;
  an impeller connected to the rotary shaft; and
  a bracket that is disposed in the motor body and that comprises a bearing housing portion that accommodates the bearing,
  wherein the bearing comprises:
    an inner rim fixed to the rotary shaft,
    an outer rim spaced apart from the inner rim, and
    a rolling member disposed between the inner rim and the outer rim,
  wherein the bearing housing portion defines a bearing heat dissipation flow path that is configured to guide an air moved by the impeller through a space defined between the bearing housing portion and an outer circumferential surface of the outer rim and that is configured to discharge the air to an outside of the bearing housing portion,
  wherein the bearing heat dissipation flow path comprises a plurality of bearing heat dissipation flow paths that is disposed at the bearing housing portion and spaced apart from one another along the outer circumferential surface of the outer rim, and wherein an inner circumferential surface of the bearing housing portion defines a plurality of contact surfaces that is in contact with the outer circumferential surface of the bearing and disposed between the plurality of bearing heat dissipation flow paths, the plurality of contact surfaces being spaced apart from one another in a circumferential direction of the bearing housing portion.

16. The fan motor of claim 15, wherein the bearing heat dissipation flow path is defined on the inner circumferential surface of the bearing housing portion.

17. The fan motor of claim 15, wherein the bearing heat dissipation flow path faces the outer circumferential surface of the outer rim in a radial direction of the bearing housing portion.

18. The fan motor of claim 15, wherein the bearing housing portion comprises:
   a hollow body that is in contact with the outer circumferential surface of the outer rim; and
   a cover body that is disposed at the hollow body, that covers a portion of the bearing between the inner rim and the outer rim, and that faces the impeller, and
   wherein the bearing heat dissipation flow path is defined in at least one of the hollow body or the cover body.

19. The fan motor of claim 18, wherein the bearing heat dissipation flow path comprises:
   a first heat dissipation flow path that is parallel to the rotary shaft and that extends along an inner circumferential surface of the hollow body; and
   a second heat dissipation flow path that connects the first heat dissipation flow path to an outer surface of the bearing housing portion.

* * * * *